(12) United States Patent
Lopes Agnese et al.

(10) Patent No.: US 12,501,843 B2
(45) Date of Patent: Dec. 23, 2025

(54) METHOD FOR DETERMINING FIELD-OR ZONE-SPECIFIC SEEDING RATE, DEPTH, AND TIME FOR PLANTING A CROP IN AN AGRICULTURAL FIELD BASED ON MULTIPLE DATA INPUTS SUCH AS CROP, FIELD, YIELD, WEATHER, AND/OR SOIL DATA

(71) Applicant: BASF AGRO TRADEMARKS GMBH, Ludwigshafen (DE)

(72) Inventors: Mauricio Lopes Agnese, Cologne (DE); Bjoern Kiepe, Twistetal (DE); Mollie Jo Hoss-Kuhne, Windeck (DE); Jerome Casadebaig, Lyons (FR); Vagner Pasolius Wexel, Cologne (DE); Hubert Schmeer, Odenthal (DE); Fabrisio De Eustaquio Resende, Rio Verde (BR)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 132 days.

(21) Appl. No.: 18/268,004

(22) PCT Filed: Dec. 17, 2021

(86) PCT No.: PCT/EP2021/086610
§ 371 (c)(1),
(2) Date: Jun. 16, 2023

(87) PCT Pub. No.: WO2022/136182
PCT Pub. Date: Jun. 30, 2022

(65) Prior Publication Data
US 2024/0049619 A1 Feb. 15, 2024

(30) Foreign Application Priority Data

Dec. 23, 2020 (EP) .................................. 20216859

(51) Int. Cl.
*A01B 79/00* (2006.01)
*A01C 7/10* (2006.01)
*A01C 21/00* (2006.01)

(52) U.S. Cl.
CPC ............ *A01B 79/005* (2013.01); *A01C 7/102* (2013.01); *A01C 21/005* (2013.01)

(58) Field of Classification Search
CPC ..... A01B 79/005; A01C 7/102; A01C 21/005; A01C 7/203; A01C 21/00
See application file for complete search history.

(56) References Cited

U.S. PATENT DOCUMENTS 6,070,539 A * 6/2000 Flamme ............... A01M 7/0089
701/50
8,855,937 B2 * 10/2014 Lindores ................ G06Q 10/06
703/11

(Continued)

FOREIGN PATENT DOCUMENTS

WO WO-2013/169349 A1 11/2013

OTHER PUBLICATIONS

International Search Report and Written Opinion of International Application No. PCT/EP2021/086610 mailed Apr. 21, 2022, 8 pgs.

(Continued)

*Primary Examiner* — Thomas Ingram
(74) *Attorney, Agent, or Firm* — ArentFox Schiff LLP

(57) ABSTRACT

A computer-implemented method for determining at least one of the treatment parameters selected from the group consisting of: (a) at least one rate (seeding rate) for planting at least one crop in a field or a sub-field zone, (b) at least one depth (seeding depth) for planting at least one crop in a field or a sub-field zone, and (c) at least one time window (seeding time) for planting at least one crop in a field or a (Continued)

Figure 1:
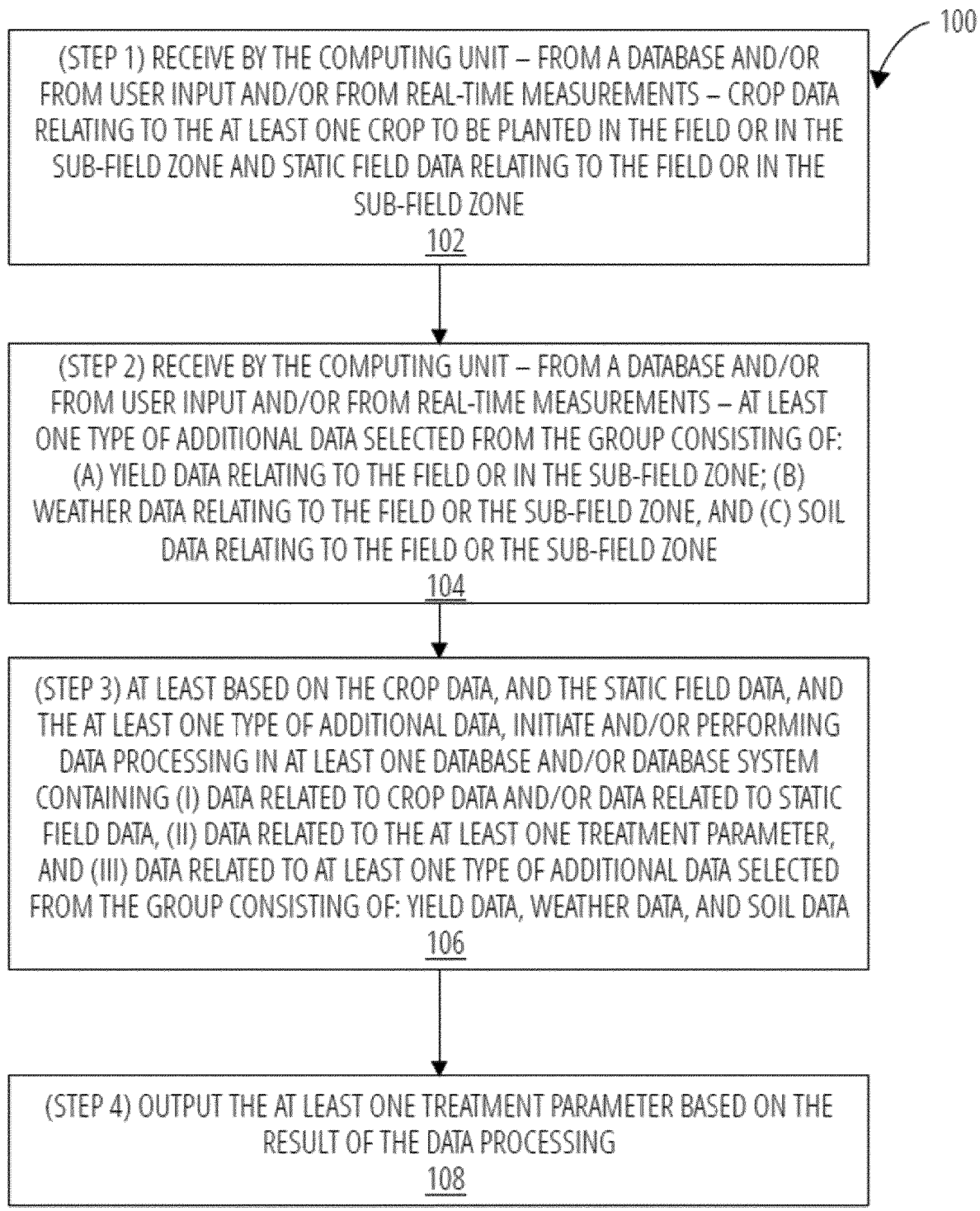

sub-field zone, comprising the following steps: (step 1) receiving by the computing unit—from a database and/or from user input and/or from real-time measurements—crop data relating to the at least one crop to be planted in the field or in the sub-field zone and static field data relating to the field or the sub-field zone, (step 2) receiving by the computing unit—from a database and/or from user input and/or from real-time measurements—at least one type of additional data selected from the group consisting of: (A) yield data relating to the field or the sub-field zone, (B) weather data relating to the field or the sub-field zone, and (C) soil data relating to the field or the sub-field zone, (step 3) at least based on the crop data, and the static field data, and the at least one type of additional data, initiating and/or performing data processing in at least one database and/or database system containing (i) data related to crop data and/or data related to static field data, (ii) data related to the at least one treatment parameter, and (iii) data related to at least one type of additional data selected from the group consisting of: yield data, weather data, and soil data, (step 4) outputting the at least one treatment parameter based on the result of the data processing.

19 Claims, 3 Drawing Sheets

(56) References Cited

U.S. PATENT DOCUMENTS

| | | | | |
|---|---|---|---|---|
| 9,285,501 | B2* | 3/2016 | Christy | G01N 21/3563 |
| 10,109,024 | B2 | 10/2018 | Bakke et al. | |
| 10,165,725 | B2* | 1/2019 | Sugumaran | G01C 21/3461 |
| 2012/0109614 | A1* | 5/2012 | Lindores | A01B 79/005 |
| | | | | 703/11 |
| 2014/0012732 | A1 | 1/2014 | Lindores et al. | |
| 2018/0092295 | A1* | 4/2018 | Sugumaran | A01C 14/00 |
| 2018/0114062 | A1* | 4/2018 | Barrier | G06V 20/182 |
| 2019/0050948 | A1 | 2/2019 | Perry et al. | |
| 2020/0042890 | A1 | 2/2020 | Merrill et al. | |
| 2020/0288626 | A1 | 9/2020 | Ethington et al. | |
| 2023/0320274 | A1* | 10/2023 | Vandike | G06V 20/56 |
| | | | | 701/50 |
| 2024/0138280 | A1* | 5/2024 | Lovett | A01B 69/008 |

OTHER PUBLICATIONS

European Search Report for EP Patent Application No. 20216859.7, Issued on Jun. 9, 2021, 3 pages.

Mohr, et al., "Chapter 49: Physiologie und Ertragsbildung", Lehrbuch der Pflanzenphysiologie, 3rd Edition, 1978, pp. 560-561.

* cited by examiner

METHOD FOR DETERMINING FIELD- OR ZONE-SPECIFIC SEEDING RATE, DEPTH, AND TIME FOR PLANTING A CROP IN AN AGRICULTURAL FIELD BASED ON MULTIPLE DATA INPUTS SUCH AS CROP, FIELD, YIELD, WEATHER, AND/OR SOIL DATA

FIELD OF THE INVENTION

The present invention relates to a computer-implemented method for determining treatment parameters including field- or zone-specific seeding rate, seeding depth, and seeding time for planting a crop in an agricultural field based on multiple data inputs such as crop, field, yield, weather, and/or soil data, a data processing system comprising means for carrying out such computer-implemented method, the use of such treatment parameters for controlling an agricultural equipment, and the use of such treatment parameters for treating an agricultural field.

BACKGROUND OF THE INVENTION

In practice, the farmer or user often faces the challenge that he/she cannot determine the optimal field- or zone-specific seeding rate, seeding depth, and seeding time in a systematic way, although all the data or information about the different features of the field or the sub-field zone—including for example altitude, elevation, historical yield potential, soil texture, soil moisture, and regulatory data—are in principle available or can be made available. This may lead to the problem that the seeding rate, the seeding depth or the seeding time selected by the farmer or user is inappropriate or inefficient for achieving either the best yield, or the best crop value in terms of oil, protein, or nutrient content, or the best sustainability effect in terms of the minimized use of crop protection agent.

In the prior art, WO 2013/169349 A1 discloses a method for forecasting optimum planting time, based on meteorological data and soil temperature. WO 2013/169349 A1 does not disclose a systematic approach for determining zone-specific seeding rate, seeding depth, and seeding time.

In view of the above problem and challenge, it was found that there is a need to improve and simplify the decision process of the farmer or user in this regard.

SUMMARY OF THE INVENTION

In view of the above, it is an object of the present invention to provide a computer-implemented method for determining treatment parameters including field- or zone-specific seeding rate, seeding depth, and seeding time for planting a crop in an agricultural field based on multiple data inputs such as crop, field, yield, weather, and/or soil data. It is also an object of the present invention to provide a computer-implemented method for determining the above mentioned treatment parameters, which supports fast, real-time and efficient decision-making for a farmer or user regarding the treatment of an agricultural field. It is also an object of the present invention to provide a computer-implemented method for determining the above mentioned treatment parameters, which enables the output of an application map which may be used for controlling an agricultural equipment. It is also an object of the present invention to provide a computer-implemented method to improve the yield of the crops planted in an agricultural field. It is also an object of the present invention to provide a computer-implemented method to improve the crop value, including the oil content, protein content, or nutrient content of the crops planted in an agricultural field. It is also an object of the present invention to provide a computer-implemented method to minimize the use of crop protection agents such as herbicides, fungicides, or insecticides, for growing a cop in an agricultural field.

The objects of the present invention are solved with the subject matter of the independent claims, wherein further embodiments are incorporated in the dependent claims. It should be noted that the following described aspects and examples of the invention apply for the method as well as for the data processing system, the computer program product and the computer-readable storage medium.

According to the first aspect of the present invention, the present invention relates to:

A computer-implemented method for determining at least one of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone,
comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—at least one type of additional data selected from the group consisting of:
(A) yield data relating to the field or the sub-field zone,
(B) weather data relating to the field or the sub-field zone, and
(C) soil data relating to the field or the sub-field zone,
(step 3) at least based on the crop data, and the static field data, and the at least one type of additional data, initiating and/or performing data processing in at least one database and/or database system containing
(i) data related to crop data and/or data related to static field data,
(ii) data related to the at least one treatment parameter, and
(iii) data related to at least one type of additional data selected from the group consisting of: yield data, weather data, and soil data,
(step 4) outputting the at least one treatment parameter based on the result of the data processing.

According to the further aspect of the present invention, the present invention relates to:

A computer-implemented method for determining all two of the treatment parameters selected from the group consisting of:
(a) at least one rate (seeding rate) for planting at least one crop in a field or a sub-field zone, and
(b) at least one depth (seeding depth) for planting at least one crop in a field or a sub-field zone, and
comprising the following steps:
(step 1) receiving by the computing unit—from a database and/or from user input and/or from real-time measurements—crop data relating to the at least one crop to be planted in the field or in the sub-field zone and static field data relating to the field or the sub-field zone, (step 2) receiving by the computing unit—from a database and/or from user input and/or from real-time measurements—at least one type of additional data selected from the group consisting of:
(A) yield data relating to the field or the sub-field zone,
(B) weather data relating to the field or the sub-field zone, and
(C) soil data relating to the field or the sub-field zone,
(step 3) at least based on the crop data, and the static field data, and the at least one type of additional data, initiating and/or performing data processing in at least one database and/or database system containing
(i) data related to crop data and/or data related to static field data,
(ii) data related to the at least one treatment parameter, and
(iii) data related to at least one type of additional data selected from the group consisting of: yield data, weather data, and soil data,
(step 4) outputting the two treatment parameters based on the result of the data processing.

According to the further aspect of the present invention, the present invention relates to:
A computer-implemented method for determining at least two of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—at least one type of additional data selected from the group consisting of:
(A) yield data relating to the field or the sub-field zone,
(B) weather data relating to the field or the sub-field zone, and
(C) soil data relating to the field or the sub-field zone,
(step 3) at least based on the crop data, and the static field data, and the at least one type of additional data, initiating and/or performing data processing in at least one database and/or database system containing
(i) data related to crop data and/or data related to static field data,
(ii) data related to the at least one treatment parameter, and
(iii) data related to at least one type of additional data selected from the group consisting of: yield data, weather data, and soil data,
(step 4) outputting the at least two treatment parameters based on the result of the data processing.

According to the further aspect of the present invention, the present invention relates to:
A computer-implemented method for determining all three of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—at least one type of additional data selected from the group consisting of:
(A) yield data relating to the field or the sub-field zone,
(B) weather data relating to the field or the sub-field zone, and
(C) soil data relating to the field or the sub-field zone,
(step 3) at least based on the crop data, and the static field data, and the at least one type of additional data, initiating and/or performing data processing in at least one database and/or database system containing
(i) data related to crop data and/or data related to static field data,
(ii) data related to the at least one treatment parameter, and
(iii) data related to at least one type of additional data selected from the group consisting of: yield data, weather data, and soil data,
(step 4) outputting all three treatment parameters based on the result of the data processing.

According to the further aspect of the present invention, the present invention relates to:
A computer-implemented method for determining all three of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements:
(A) yield data relating to the field or the sub-field zone,
(C) soil data relating to the field or the sub-field zone,
(step 3) at least based on the crop data, and the static field data, and the yield data, and the soil data, initiating and/or performing data processing in at least one database and/or database system containing
(i) data related to crop data and/or data related to static field data,
(ii) data related to the at least one treatment parameter, and
(iii) data related to yield data, and data related to soil data,
(step 4) outputting all three treatment parameters based on the result of the data processing,
wherein the crop data the crop data includes species or variety data of the at least one crop to be planted in the field or in the sub-field zone and regulatory data relating to at least one crop to be planted in the field or in the sub-field zone, wherein the soil data includes soil texture and soil moisture of the soil in the field or in the sub-field zone, wherein the yield data includes:
a) Historical yield potential of the field or the sub-field zone, wherein the historical yield potential is preferably determined based on remotely sensed green-leaf area or biomass data of the field or sub-field zone, and/or
b) Historical actual yield of the field or the sub-field zone, determined based on the amounts harvested in the past from the field or sub-field zone.

According to a further aspect of the present invention, the present invention relates to:

A computer-implemented method for determining at least one of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—
(A) yield data relating to the field or the sub-field zone, and
(B) weather data relating to the field or the sub-field zone,
(step 3) at least based on the crop data, and the static field data, and the yield data, and the weather data, initiating and/or performing data processing in at least one database and/or database system containing
(i) data related to crop data and/or data related to static field data,
(ii) data related to the at least one treatment parameter, and
(iii) data related to yield data, and
(iv) data related to weather data,
(step 4) outputting the at least one treatment parameter based on the result of the data processing.

According to a further aspect of the present invention, the present invention relates to:

A computer-implemented method for determining at least one of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—
(A) yield data relating to the field or the sub-field zone, and
(C) soil data relating to the field or the sub-field zone,
(step 3) at least based on the crop data, and the static field data, and the yield data, and the soil data, initiating and/or performing data processing in at least one database and/or database system containing
(i) data related to crop data and/or data related to static field data,
(ii) data related to the at least one treatment parameter, and
(iii) data related to yield data, and
(iv) data related to soil data,
(step 4) outputting the at least one treatment parameter based on the result of the data processing.

According to a further aspect of the present invention, the present invention relates to:

A computer-implemented method for determining at least one of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) receiving by the computing unit—from a database and/or from user input and/or from real-time measurements—crop data relating to the at least one crop to be planted in the field or in the sub-field zone and static field data relating to the field or the sub-field zone,
(step 2) receiving by the computing unit—from a database and/or from user input and/or from real-time measurements—
(B) weather data relating to the field or the sub-field zone, and
(C) soil data relating to the field or the sub-field zone,
(step 3) at least based on the crop data, and the static field data, and the weather data, and the soil data, initiating and/or performing data processing in at least one database and/or database system containing
(i) data related to crop data and/or data related to static field data,
(ii) data related to the at least one treatment parameter, and
(iii) data related to weather data, and
(iv) data related to soil data,
(step 4) outputting the at least one treatment parameter based on the result of the data processing.

According to a further aspect of the invention, the crop data relating to the at least one crop to be planted in the field or in the sub-field zone include:
a) species or variety data of the at least one crop to be planted in the field or in the sub-field zone, and/or
b) crop value data of the at least one crop to be planted in the field or in the sub-field zone,
c) agronomic data relating to the at least one crop to be planted in the field or in the sub-field zone, and/or
d) regulatory data relating to the at least one crop to be planted in the field or in the sub-field zone.

According to a further aspect of the invention, the crop data relating to the at least one crop to be planted in the field or in the sub-field zone include:

a) species or variety data of the at least one crop to be planted in the field or in the sub-field zone, wherein the species or variety data preferably includes genetic information of such crop, and/or
b) crop value data of the at least one crop to be planted in the field or in the sub-field zone, wherein the crop value data preferably includes oil content, protein content, and/or nutrient content of such crop,
c) agronomic data relating to the at least one crop to be planted in the field or in the sub-field zone, wherein the agronomic data preferably includes days to sexual maturity, vigor, emergence rating of such crop, and/or
d) regulatory data relating to the at least one crop to be planted in the field or in the sub-field zone, wherein the regulatory data preferably includes region-specific information on the legal framework and/or regulations relating to the treatment parameters, region-specific information on measures of product stewardship, information on biodiversity regulations or biodiversity measures.

According to a further aspect of the invention, the crop data relating to the at least one crop to be planted in the field or in the sub-field zone preferably include species or variety data of the at least one crop to be planted in the field or in the sub-field zone, wherein the species or variety data preferably includes genetic information of such crop.

According to a further aspect of the invention, the crop data relating to the at least one crop to be planted in the field or in the sub-field zone preferably include crop value data of the at least one crop to be planted in the field or in the sub-field zone, wherein the crop value data preferably includes oil content, protein content, and/or nutrient content of such crop.

According to a further aspect of the invention, the crop data relating to the at least one crop to be planted in the field or in the sub-field zone preferably include agronomic data relating to the at least one crop to be planted in the field or in the sub-field zone, wherein the agronomic data preferably includes days to sexual maturity, vigor, emergence rating of such crop.

According to a further aspect of the invention, the crop data relating to the at least one crop to be planted in the field or in the sub-field zone preferably include regulatory data relating to the at least one crop to be planted in the field or in the sub-field zone, wherein the regulatory data preferably includes region-specific information on the legal framework and/or regulations relating to the treatment parameters, region-specific information on measures of product stewardship, information on biodiversity regulations or biodiversity measures.

In a preferred embodiment of the invention, the crop data relating to the at least one crop to be planted in the field or in the sub-field zone are received by the computing unit from a database. In a preferred embodiment of the invention, the crop data relating to the at least one crop to be planted in the field or in the sub-field zone are received by the computing unit from user input.

According to a further aspect of the invention, the static field data relating to the field or the sub-field zone include:
a) GPS (Global Positioning System), geographical location data, and/or geographical positioning data relating to the field or the sub-field zone, and/or
b) altitude, elevation, slope, and/or relief data relating to the field or the sub-field zone, and/or
c) data relating to the application of crop protection or crop nutrition products on the field or on the sub-field zone in the past, data regarding the pre-season soil treatment on the field or on the sub-field zone, and/or data regarding the type of cultivation of the field or the sub-field zone.

According to a further aspect of the invention, the static field data relating to the field or the sub-field zone preferably include: GPS (Global Positioning System), geographical location data, and/or geographical positioning data relating to the field or the sub-field zone.

According to a further aspect of the invention, the static field data relating to the field or the sub-field zone preferably include: altitude, elevation, slope, and/or relief data relating to the field or the sub-field zone According to a further aspect of the invention, the static field data relating to the field or the sub-field zone preferably include: data relating to the application of crop protection or crop nutrition products on the field or on the sub-field zone in the past, data regarding the pre-season soil treatment on the field or on the sub-field zone, and/or data regarding the type of cultivation of the field or the sub-field zone.

In a preferred embodiment of the invention, the static field data relating to the field or the sub-field zone are received by the computing unit from a database. In a preferred embodiment of the invention, the static field data relating to the field or the sub-field zone are received by the computing unit from user input.

According to a further aspect of the invention, the yield data relating to the field or the sub-field zone include
a) Historical yield potential of the field or the sub-field zone, wherein the historical yield potential is preferably determined based on remotely sensed green-leaf area or biomass data of the field or sub-field zone, and/or
b) Historical actual yield of the field or the sub-field zone, determined based on the amounts harvested in the past, and/or
c) Forecasted yield potential of the field or the sub-field zone.

According to a further aspect of the invention, the yield data relating to the field or the sub-field zone is related to the crop to be planted in the field or in the sub-field zone. For example, if the crop to be planted in the field or in the sub-field zone is soybean, only yield data relating to soybean will be received by the computing unit, yield data relating e.g. to corn or wheat will be filtered out.

According to a further aspect of the invention, the yield data relating to the field or the sub-field zone include
a) Historical yield potential of the field or the sub-field zone relating to the crop to be planted in the corresponding field or the sub-field zone, wherein the historical yield potential is preferably determined based on remotely sensed green-leaf area or biomass data of the field or sub-field zone, and/or
b) Historical actual yield of the field or the sub-field zone relating to the crop to be planted in the corresponding field or the sub-field zone, determined based on the amounts harvested in the past, and/or
c) Forecasted yield potential of the field or the sub-field zone relating to the crop to be planted in the corresponding field or the sub-field zone.

According to a further aspect of the invention, the yield data relating to the field or the sub-field zone include: Historical yield potential of the field or the sub-field zone, wherein the historical yield potential is preferably determined based on remotely sensed green-leaf area or biomass data of the field or sub-field zone. The historical yield potential can be preferably indicated in a historic yield potential map showing the historical yield potentials of different sub-field zones (e.g. "Powerzone maps"). The historical yield potential can be preferably determined based on remotely sensed green-leaf area or biomass data of the corresponding field or sub-field zone of not less than the last 2 years, more preferably not less than the last 4 years, most preferably not less than the last 6 years, particularly not less than the last 8 years, particularly preferably not less than the last 10 years. In this context, the term "remotely sensed" preferably means: remotely sensed by satellite, airplane, unmanned aerial vehicle, drone, optical sensor, or LiDAR sensor.

According to a further aspect of the invention, the yield data relating to the field or the sub-field zone include: Historical actual yield of the field or the sub-field zone, determined based on the amounts harvested in the past from the field or the sub-field zone. The historical actual yield can be determined based on the amounts harvested from the field or the sub-field zone in the past of not less than the last 2 years, more preferably not less than the last 4 years, most preferably not less than the last 6 years, particularly not less than the last 8 years, particularly preferably not less than the last 10 years.

According to a further aspect of the invention, the yield data relating to the field or the sub-field zone include: Forecasted yield potential of the field or the sub-field zone, wherein the forecasted yield potential is preferably estimated based on the historic yield potential and/or the historical actual yield and optionally based on weather forecasts (e.g. weather forecasts for the duration of the entire crop season, using specific weather models), or wherein the forecasted yield potential is estimated based on yield prediction models, i.e. prediction models for yield data.

According to a further aspect of the invention, the yield data relating to the field or the sub-field zone include
a) Historical yield potential of the field or the sub-field zone, wherein the historical yield potential is preferably determined based on remotely sensed green-leaf area or biomass data of the field or the sub-field zone, and
b) Historical actual yield of the field or the sub-field zone, determined based on the amounts harvested in the past from the field or the sub-field zone,
wherein the historical yield potential (referred to as "HYP") and historical actual yield data (referred to as "HAY") are preferably combined with predefined or user-defined weighting factors. In another preferred embodiment, the historical yield potential and historical actual yield data may be combined with X % weighting regarding HYP and Y % weighting regarding HAY, e.g. the final yield data relating to the field or the sub-field zone is calculated with the formula X %*HYP+Y %*HAY, with X % being preferably in the range of 10% to 90%, more preferably in the range of 20% to 80%, most preferably in the range of 30% to 70%, with Y % being preferably in the range of 10% to 90%, more preferably in the range of 20% to 80%, most preferably in the range of 30% to 70%, and with X % and Y % totaling 100%. In a preferred embodiment, the historical yield potential (referred to as "HYP") and historical actual yield (referred to as "HAY") data may be combined with each 50% weighting, e.g. the final yield data relating to the field or the sub-field zone is calculated with the formula 50%*HYP+50%*HAY. In another preferred embodiment, the historical yield potential and historical actual yield data may be combined with 30% weighting regarding HYP and 70% weighting regarding HAY, e.g. the final yield data relating to the field or the sub-field zone is calculated with the formula 30%*HYP+70%*HAY. In another preferred embodiment, the historical yield potential and historical actual yield data may be combined with 70% weighting regarding HYP and 30% weighting regarding HAY, e.g. the final yield data relating to the field or the sub-field zone is calculated with the formula 70%*HYP+30%*HAY.

According to a further aspect of the invention, in the case three input data are used, for example yield data, static field data, and soil data, these data can be combined—particularly in the data processing step—with predefined or user-defined weighting factors, with A % weighting regarding the first input data (referred as "AIP") (e.g. yield data) and B % weighting regarding the second input data (referred as "BIP") (e.g. static field data, such as altitude or slope) and C % weighting regarding the third input data (referred as "CIP") (e.g. soil data, such as soil texture, or soil organic matter, or soil moisture), e.g. the final combination of the three input data is calculated with the formula A %*AIP+B %*BIP+C %*CIP, with A %, B %, and C % being preferably in the range of 10% to 90%, more preferably in the range of 20% to 80%, most preferably in the range of 30% to 70%, and with A %, B % and C % totaling 100%. According to a further aspect of the invention, in the case four input data are used, for example yield data, static field data, and soil data no. 1 and soil data no. 2, these data can be combined—particularly in the data processing step—with predefined or user-defined weighting factors, with A % weighting regarding the first input data (referred as "AIP") (e.g. yield data) and B % weighting regarding the second input data (referred as "BIP") (e.g. static field data, such as altitude or slope) and C % weighting regarding the third input data (referred as "CIP") (e.g. soil data no. 1, such as soil texture, or soil organic matter), and D % regarding the fourth input data (referred as "DIP") (e.g. soil data no. 2, such as soil moisture) the final combination of the four input data is calculated with the formula A %*AIP+B %*BIP+C %*CIP+D % DIP, with A %, B %, C %, and D % being preferably in the range of 10% to 90%, more preferably in the range of 20% to 80%, most preferably in the range of 30% to 70%, and with A %, B %, C % and D % totaling 100%.

In a preferred embodiment of the invention, the yield data relating to the field or the sub-field zone are received by the computing unit from a database. In a preferred embodiment of the invention, the yield data relating to the field or the sub-field zone are received by the computing unit from user input.

According to a further aspect of the invention, the weather data relating to the field or the sub-field zone include: temperature, air temperature, soil temperature, soil surface temperature, canopy temperature, humidity, air humidity, relative humidity, precipitation, moisture, wind condition, wind speed, and/or sunlight level data relating to the field or the sub-field zone. In a preferred embodiment, the weather data include weather data forecasted for the upcoming days and weeks. In a preferred embodiment, the weather data include weather data at least for the 4 days, more preferably at least for the 1 week, most preferably at least for the 2 weeks, particularly preferably at least for the 3 weeks before planting the crop to be planted in the field or in the sub-field zone. In a preferred embodiment, the weather data include weather data forecasted at least for the upcoming 4 days, more preferably at least for the upcoming 1 week, most preferably at least for the upcoming 2 weeks, particularly preferably at least for the upcoming 3 weeks after planting the crop to be planted in the field or in the sub-field zone. In a preferred embodiment, the weather data include weather data for the days or weeks before planting the crop to be planted in the field or in the sub-field zone and weather data forecasted for the days or weeks after planting the crop to be planted in the field or in the sub-field zone. In a preferred embodiment, the weather data include air temperature, relative humidity, and/or precipitation.

In a preferred embodiment of the invention, the weather data relating to the field or the sub-field zone are received by the computing unit from real-time measurements, preferably using remote or proximal weather sensors.

In a preferred embodiment of the invention, the weather data relating to the field or the sub-field zone are generated by a prediction model for weather data.

According to a further aspect of the invention, the soil data relating to the field or the sub-field zone are received by the computing unit from real-time measurements, preferably using remote or proximal soil sensors.

According to a further aspect of the invention, the soil data relating to the field or the sub-field zone are data indicative of the biological, biochemical, chemical, and/or physical properties of the soil in the field or the sub-field zone.

According to a further aspect of the invention, the soil data relating to the field or the sub-field zone include:
  a) soil organic matter, total carbon content, organic carbon content, inorganic carbon content, boron content, phosphorus content, potassium content, nitrogen content, sulfur content, calcium content, iron content, aluminum content, chlorine content, molybdenum content, magnesium content, nickel content, copper content, zinc content, Manganese content, and/or pH value of the soil in the field or the sub-field zone; and/or
  b) soil quality, soil sandiness, soil moisture, soil humidity, soil temperature, soil surface temperature, soil density, soil texture, soil conductivity, and/or water holding capacity of the soil in the field or the sub-field zone.

According to a further aspect of the invention, the soil data relating to the field or the sub-field zone include soil organic matter, total carbon content, organic carbon content, and/or inorganic carbon content of the soil in the field or the sub-field zone. According to a further aspect of the invention, the soil data relating to the field or the sub-field zone include the nitrogen content of the soil in the field or the sub-field zone. According to a further aspect of the invention, the soil data relating to the field or the sub-field zone include soil quality, soil sandiness, soil moisture, soil humidity, soil temperature, soil surface temperature, soil density, soil texture, soil conductivity, and/or water holding capacity of the soil in the field or the sub-field zone the nitrogen content. According to a further aspect of the invention, the soil data relating to the field or the sub-field zone include the soil texture. According to a further aspect of the invention, the soil data relating to the field or the sub-field zone include the soil moisture. According to a further aspect of the invention, the soil data relating to the field or the sub-field zone include the soil texture and the soil moisture.

According to a further aspect of the invention, the soil data relating to the field or the sub-field zone include at least two different types of soil data, for example soil texture and soil moisture, or for example soil texture and soil organic matter.

According to a further aspect of the invention, the timeframe between receiving the yield data, or weather data, or soil data and the output of the treatment parameter is from 1 millisecond to 1 hour, preferably from 1 millisecond to 60 seconds, more preferably from 1 millisecond to 5 seconds. In a preferred embodiment of the invention, the timeframe between receiving the yield data, or weather data, or soil data and the output of the treatment parameter does not exceed 30 minutes, preferably 20 minutes, more preferably 10 minutes, most preferably 5 minutes, particularly 2 minutes, particularly preferably 60 seconds, particularly more preferably 30 seconds, particularly most preferably 15 seconds, for instance 5 seconds, for example 3 seconds. In a preferred embodiment of the invention, the timeframe between receiving the yield data, or weather data, or soil data and the output of the treatment parameter is at least 1 millisecond, preferably 10 milliseconds, more preferably at least 50 milliseconds, most preferably at least 100 milliseconds.

According to a further aspect of the invention, at least the steps (step 2), (step 3) and (step 4) are carried out in a real-time mode, preferably carried out in a timeframe ranging from 1 millisecond to 2 minutes, more preferably in a timeframe ranging from 1 millisecond to 60 seconds, most preferably in a timeframe ranging from 1 millisecond to 30 seconds, particularly in a timeframe ranging from 1 millisecond to 15 seconds, particularly preferably in a timeframe ranging from 1 millisecond to 5 seconds, particularly more preferably in a timeframe ranging from 1 millisecond to 3 seconds, for example in a timeframe ranging from 1 millisecond to 1 second. In another preferred embodiment of the invention, at least the steps (step 2), (step 3) and (step 4) are carried out in preferably less than a minute, more preferably within 10 to 45 seconds, most preferably within 1 to 10 seconds, more preferably within 0.5 to 1 seconds, most preferably within 100 to 500 milliseconds, particularly within 10 to 100 milliseconds.

According to a further aspect of the invention, real-time measurements are measurements which carried out by a sensor—for example a remote sensor, a proximal sensor, a remote soil sensor or a proximal soil sensor—or another instrument at the time X and the computing unit receives the data obtained from these measurements at the time Y which is later than time X, wherein the time difference between X and Y is preferably in a timeframe ranging from 1 millisecond to 2 minutes, more preferably in a timeframe ranging from 1 millisecond to 60 seconds, most preferably in a timeframe ranging from 1 millisecond to 30 seconds, particularly in a timeframe ranging from 1 millisecond to 15 seconds, particularly preferably in a timeframe ranging from 1 millisecond to 5 seconds, particularly more preferably in a timeframe ranging from 1 millisecond to 3 seconds, for example in a timeframe ranging from 1 millisecond to 1 second.

According to a further aspect of the invention, the treatment parameter will be outputted or further processed as a control signal for an agricultural equipment, wherein the agricultural equipment is preferably a seed drill or planter.

According to a further aspect of the invention, the treatment parameter will be outputted or further processed as a control signal for an agricultural equipment embedded in a treatment management system, wherein the agricultural equipment is preferably a seed drill or planter.

According to a further aspect of the invention, the treatment parameters will be outputted as an application map useful for controlling an agricultural equipment, wherein the agricultural equipment is preferably a seed drill or planter, wherein such application map preferably indicates different treatment parameter or a different combination of more than one treatment parameter for different sub-field zones.

In a preferred embodiment of the present invention, the agricultural equipment may be or may include:
- ground robots with variable-rate applicators,
- aerial applicators (such as unmanned aerial vehicles, drones),
- means for application of seeds—including equipment for seed broadcasting, dibbing, seed dropping behind the plough, drilling, hill dropping, check rowing and transplanting,
- regular drill planter, in which for instance the seeds are picked from the hopper by a specific circular-shaped plate and released in the shank to be delivered through gravity to the bottom of the furrow,
- other variable-rate seed applicators.

According to a further aspect of the invention, treatment parameter is the seeding rate and the yield data includes
a) Historical yield potential of the field or the sub-field zone, wherein the historical yield potential is preferably determined based on remotely sensed green-leaf area or biomass data of the field or sub-field zone, or
b) Historical actual yield of the field or the sub-field zone, determined based on the amounts harvested in the past from the field or sub-field zone.

According to a further aspect of the invention, treatment parameter is the seeding rate and the yield data includes
a) Historical yield potential of the field or the sub-field zone, wherein the historical yield potential is preferably determined based on remotely sensed green-leaf area or biomass data of the field or sub-field zone, and
b) Historical actual yield of the field or the sub-field zone, determined based on the amounts harvested in the past from the field or sub-field zone.

According to a further aspect of the invention, treatment parameter is the seeding rate and the yield data includes
a) Historical yield potential of the field or the sub-field zone, wherein the historical yield potential is preferably determined based on remotely sensed green-leaf area or biomass data of the field or sub-field zone, and
b) Historical actual yield of the field or the sub-field zone, determined based on the amounts harvested in the past from the field or sub-field zone,
wherein the historical yield potential and historical actual yield data are preferably combined with predefined or user-defined weighting factors.

According to a further aspect of the invention, the treatment parameter is the seeding depth and the soil data includes soil texture and soil moisture of the soil in the field or in the sub-field zone According to a further aspect of the invention, the treatment parameter is the seeding time, and the crop data includes species or variety data of the at least one crop to be planted in the field or in the sub-field zone and regulatory data relating to at least one crop to be planted in the field or in the sub-field zone, and the soil data includes soil moisture of the soil in the field or in the sub-field zone.

According to a further aspect of the invention, the treatment parameter is the seeding rate, and the seeding depth, and the seeding time, and
- the crop data includes species or variety data of the at least one crop to be planted in the field or in the sub-field zone and regulatory data relating to at least one crop to be planted in the field or in the sub-field zone,
- the soil data includes soil texture and soil moisture of the soil in the field or in the sub-field zone,
- the yield data includes:
  a) Historical yield potential of the field or the sub-field zone, wherein the historical yield potential is preferably determined based on remotely sensed green-leaf area or biomass data of the field or sub-field zone, and/or
  b) Historical actual yield of the field or the sub-field zone, determined based on the amounts harvested in the past from the field or sub-field zone.

According to a further aspect of the invention, in the invention also relates to a data processing system comprising means for carrying out the computer-implemented method of the present invention.

According to a further aspect of the invention, in the invention also relates to a computer program product comprising instructions which, when the program is executed by a computer, cause the computer to carry out the computer-implemented method of the present invention.

According to a further aspect of the invention, in the invention also relates to computer-readable storage medium comprising instructions which, when executed by a computer, cause the computer to carry out the computer-implemented method of the present invention.

According to a further aspect of the invention, in the invention also relates to the use of the treatment parameters determined by the computer-implemented method of the present invention.

According to a further aspect of the invention, in the invention also relates to the use of the treatment parameters determined by the computer-implemented method of the present invention.

In the context of the present invention, the term "include" means "comprise".

In the context of the present invention, the term "field" or "agricultural field" is understood to be any area in which crop plants, are produced, grown, sown, and/or planned to be produced, grown or sown. The term "field" or "agricultural field" may also include horticultural fields, and silvicultural fields.

In the context of the present invention, the term "genetic information" is understood to be any kind of information on the genetic properties of a crop or plant, including but not limited to DNA sequence, RNA sequence, parts of DNA and/or RNA sequences, molecular structure of DNA and/or RNA, epigenetic information (e.g. methylation of DNA parts), information on gene mutations, information on gene copy number variation, information on overexpression of a gene, information on expression level of a gene, information on gene shifting, information on the ratio between wild type and mutants, information on the ratio between different mutants, information on the ratio between mutants and other variants (e.g. epigenetic variants), information on the ratio of different variants (e.g. epigenetic variants), information on resistance against specific plant diseases (e.g. Septoria, yellow rust, Asian soybean rust) or pest pathogens.

In the context of the present invention, the term "Yield" is understood to be the harvested plant or crop biomass (e.g. indicated in tons or kilograms) per area unit (e.g. indicated in hectare or square meters) and per vegetation period (e.g. season), and yield is indicated for example as tons per hectare or kilograms per hectare. Notably, the term "yield" in the present disclosure can mean both, the so called "biological yield" and the so called "economic yield". Preferably, "yield" means the biological yield. The "biological yield" is defined as "the total plant mass, including roots (biomass), produced per unit area and per growing season". For the "economic yield", "only those plant organs or constituents" are taken into account "around which the plant is grown", wherein "a high biological yield is the basis for a high economic yield" (see Hans Mohr, Peter Schopfer, Lehrbuch der Pflanzenphysiologie, 3rd edition, Berlin/Heidelberg 1978, p. 560-561).

In the context of the present invention, the term "data processing" is understood to be any operation on the data to produce or output meaningful information, which is conducted by a computer system. Data processing includes but is not limited to data validation, data analysis, data aggregation, data sorting, data classification, data summarization, data conversion, data modification, data update etc. Data processing in a database or database system also may include the automated request in a database or database system and the automated outputting of the result of such request.

In the context of the present invention, the term "database" is understood to be any organized collection of data, which can be stored and accessed electronically from a computer system, including but not limited to relational database, non-relational database, graph database, network database, cloud database, in-memory database, active database, data warehouse, deductive database, distributed database, embedded data-base, end-user database, hypertext or hypermedia database, knowledge database, mobile database, operational database, parallel database, probabilistic database, real-time database, spatial database, temporal database, terminology-oriented database, and Excel databases. In a preferred embodiment of the present invention, the database is at least one of the following databases: relational database, non-relational data-base, graph database, network database, cloud database, in-memory database, active database, data warehouse, deductive database, distributed database, embedded database, enduser database, hypertext or hypermedia database, knowledge database, mobile database, operational database, parallel database, probabilistic database, real-time database, spatial database, temporal database, terminology-oriented data-base, and Excel databases.

In the context of the present invention, the term "database system" is understood to be a system comprising more than one database which are connected to each other, including but not limited to federated data-base systems, array database management systems, and other database management systems.

In the context of the present invention, the term "planted" (in "to be planted") or "planting" is understood to be placing seed or seedling onto or into the soil.

In the context of the present invention, the "rate for planting at least one crop in a field or a sub-field zone", also referred to as "seeding rate", is understood to be the amount—particularly number or weight (e.g. in kilogram)—of seeds to be planted per area (i.e. squaremeter or hectare or acre). The seeding rate is also referred to as the seeding population or seeding density.

In the context of the present invention, the "depth for planting at least one crop in a field or a sub-field zone", also referred to as "seeding depth", is understood to be distance (e.g. in centimeter) between the soil surface and the position within the soil where the seeds to be planted have to be placed.

In a preferred embodiment of the invention, the seeding depth can be from 1 cm to 8 cm, more preferably from 2 cm to 7 cm, most preferably from 3 cm to 6 cm.

In the context of the present invention, the time window for planting at least one crop in a field or a sub-field zone can preferably range from 10 days to 1 hour, more preferably from 7 days to 3 hours, most preferably from 5 days to 5 hours, particularly preferably from 3 days to 8 hours, particularly more preferably from 2 days to 12 hours, particularly from 36 hours to 16 hours, for example from 28 hours to 20 hours. The "time window for planting at least one crop in a field or a sub-field zone" is also referred to as "seeding time".

In the context of the present invention, the term "application map" is preferably a map indicating a two-dimensional spatial distribution of the seeding rate, seeding depth or seeding times which should be applied or implemented on different locations or zones within a field. In the context of the present invention, the term "sub-field zone" is understood to be a management zone or part of an agricultural field, i.e. an agricultural field can be spatially divided into more than one sub-field zone, wherein each sub-field zone may have different properties such as different biomass levels or different soil properties. Particularly, the application map may indicate that in different sub-field zones, different seeding rates and/or seeding depths should be applied or implemented. For example, the application map may indicate that in the first zone, the seeding rate should be for example 100,000 seeds per acre, and in a second zone, the seeding rate should be for example 200,000 seeds per acre.

In the context of the present invention, the chronological order between (step 1) and (step 2) can be: at the same time, or (step 1) before (step 2), or (step 2) before (step 1).

In the context of the present invention, data related to crop data may be
- any data which is—e.g. in a database or database system—connected or related to crop data,
- any data which can be transformed or translated to crop data,
- an identifier for the crop data, or
- crop data as such.

In the context of the present invention, data related to static field data may be
- any data which is—e.g. in a database or database system—connected or related to static field data,
- any data which can be transformed or translated to static field data,
- an identifier for the static field data, or
- static field data as such.

In the context of the present invention, data related to additional data may be
- any data which is—e.g. in a database or database system—connected or related to additional data,
- any data which can be transformed or translated to additional data,
- an identifier for the additional data, or
- additional data as such.

In the context of the present invention, data related to yield data may be
- any data which is—e.g. in a database or database system—connected or related to yield data,
- any data which can be transformed or translated to yield data,
- an identifier for the yield data, or
- yield data as such.

In the context of the present invention, data related to weather data may be
- any data which is—e.g. in a database or database system—connected or related to weather data,
- any data which can be transformed or translated to weather data,
- an identifier for the weather data, or
- weather data as such.

In the context of the present invention, data related to soil data may be
- any data which is—e.g. in a database or database system—connected or related to soil data,
- any data which can be transformed or translated to soil data,
- an identifier for the soil data, or
- soil data as such.

In the context of the present invention, data related to the at least one treatment parameter may be
- any data which is—e.g. in a database or database system—connected or related to the at least one treatment parameter,
- any data which can be transformed or translated to the at least one treatment parameter,
- an identifier for the at least one treatment parameter, or
- the at least one treatment parameter as such.

As the spatial variability of the soil data is a source of uncertainty for the performance of the seed, the measurements of one or more soil data, together or in combination with a prediction model, can generate predicted soil data, which can be used further in the computer-implemented method of the present invention.

The term "prediction model" as used herein may denote a model that uses mathematical and computational methods to predict an event or outcome. In an example, the prediction model is a trained computational predictive model, such as a machine learning model, which can be trained using "training data" to recognize patterns, classify data, and forecast future events. Field trials may be conducted to obtain the training data for the machine learning model. In another example, the prediction model is a parametrized mathematical approach that uses an equation-based model to describe the phenomenon of the influence of e.g. the soil data on the performance of the seed. The mathematical model is used to forecast an outcome at some future state or time based upon changes to the model inputs. The sample data from field trials may be for example used to fit the parameters of a mathematical equation, which is then used to generate a predicted performance of the seed (e.g. yield) from measured soil data.

In another preferred embodiment of the present invention, the data processing in (step 3) is carried out in a way to determine or output at least one treatment parameter with the objective of achieving the best possible and most efficient growth of the crop plant, e.g. achieving the highest yield or biomass or crop value or crop quality.

In another preferred embodiment of the present invention, the data processing in (step 3) is carried out with the following logic: For sub-field zones with higher yield data, e.g. higher historical yield potential or higher historical actual yield, the seeding rate may be accordingly increased. For sub-field zones with lower yield data, e.g. lower historical yield potential or lower historical actual yield, the seeding rate may be accordingly decreased. This logic is referred to as the "normal seeding rate logic" and is used for example for corn.

In another preferred embodiment of the present invention, the data processing in (step 3) is carried out with the following logic: For sub-field zones with higher yield data, e.g. higher historical yield potential or higher historical actual yield, the seeding rate may be accordingly decreased. For sub-field zones with lower yield data, e.g. lower historical yield potential or lower historical actual yield, the seeding rate may be accordingly increased. This logic is referred to as the "inverse seeding rate logic" and is used for example for soybean.

In another preferred embodiment of the present invention, the data processing in (step 3) is carried out with the following logic: Depending on the crop data indicative of a crop type, crop species, crop variety or genetic variant, it is
- first determined whether a "normal yield-seeding-rate logic" (i.e. the crop yield generally increases with increasing crop seeding rate, this is for example applicable for corn) or an "inverse yield-seeding-rate logic" (i.e. the crop yield generally decreases with increasing crop seeding rate, this is for example applicable for soybean) is applicable for the specific crop type, crop species, crop variety or genetic variant, and
- in case the "normal yield-seeding-rate logic" has been determined, in sub-field zones with yield data indicative of higher historical yield potential or higher historical actual yield, the seeding rate may be accordingly increased, whereas in sub-field zones with yield data indicative of lower historical yield potential or lower historical actual yield, the seeding rate may be accordingly decreased,
- in case the "inverse yield-seeding-rate logic" has been determined, in sub-field zones with yield data indicative of higher historical yield potential or higher historical actual yield, the seeding rate may be accordingly decreased, whereas in sub-field zones with yield data indicative of lower historical yield potential or lower historical actual yield, the seeding rate may be accordingly increased.

In another preferred embodiment of the present invention, the data processing in (step 3) is carried out with the following logic: Depending on the crop data indicative of a crop species, crop variety or genetic variant, it is
- first determined whether a "normal yield-seeding-rate logic" (i.e. the crop yield generally increases with increasing crop seeding rate, this is for example applicable for corn) or an "inverse yield-seeding-rate logic" (i.e. the crop yield generally decreases with increasing crop seeding rate, this is for example applicable for soybean) is applicable for the specific crop type, crop species, crop variety or genetic variant, wherein this determination is made
  a) based on already existing yield-seeding-rate correlation data indicating for the specific crop type, crop species, crop variety or genetic variant whether the "normal yield-seeding-rate logic" or the "inverse yield-seeding-rate logic" is applicable, or
  b) based on an automated or semi-automated database search for yield-seeding-rate correlation data indicating for the specific crop type, crop species, crop variety or genetic variant whether the "normal yield-seeding-rate logic" or the "inverse yield-seeding-rate logic" is applicable,
  c) based on simulated yield-seeding-rate correlation data indicating for the specific crop type, crop species, crop variety or genetic variant whether the "normal yield-seeding-rate logic" or the "inverse yield-seeding-rate logic" is applicable, wherein this simulation is based on corresponding data of other crop typs, crop species, crop varieties or genetic variants having comparable biological and/or physiological and/or morphological properties and optionally using machine learning techniques,
- in case the "normal yield-seeding-rate logic" has been determined, in sub-field zones with yield data indicative of higher historical yield potential or higher historical actual yield, the seeding rate may be accordingly increased, whereas in sub-field zones with yield data indicative of lower historical yield potential or lower historical actual yield, the seeding rate may be accordingly decreased, in case the "inverse yield-seeding-rate logic" has been determined, in sub-field zones with yield data indicative of higher historical yield potential or higher historical actual yield, the seeding rate may be accordingly decreased, whereas in sub-field zones with yield data indicative of lower historical yield potential or lower historical actual yield, the seeding rate may be accordingly increased.

In another preferred embodiment of the present invention, the data processing in (step 3) is carried out with the following logic: For sub-field zones with higher soil moisture, the seeding depth may be accordingly decreased. For sub-field zones with lower soil moisture, the seeding depth may be accordingly increased. For sub-field zones with the soil texture having a large amount of clay, the seeding depth may be accordingly decreased. For sub-field zones with the soil texture having a large amount of sand, the seeding depth may be accordingly increased. For sub-field zones with a rain forecast (e.g. a high likelihood of rainfall in the upcoming days), the seeding depth may be accordingly decreased. For sub-field zones with no rain forecast (e.g. a very low likelihood of rainfall in the upcoming days), the seeding depth may be accordingly increased.

In another preferred embodiment of the present invention, the data processing in (step 3) is carried out with the following logic: If the soil moisture is high, the seeding time will be determined in a way that this high soil moisture can be used. If the soil moisture is low and rainfall will be expected after a certain number of days, the seeding time will be determined in a way that some more days will be awaited so that the rainfall water is used as water source and the seeds have sufficient water to grow. In any way, the seeding time will be determined in a way that it is compliant with the regulatory data relating to the crop to be planted in the field or in the sub-field zone.

FIG. 1 illustrates the workflow of the embodiment of the present invention.

In FIG. 1, a computer-implemented method for determining at least one of the treatment parameters selected from the group consisting of:
(a) at least one rate (seeding rate) for planting at least one crop in a field or a sub-field zone,
(b) at least one depth (seeding depth) for planting at least one crop in a field or a sub-field zone, and
(c) at least one time window (seeding time) for planting at least one crop in a field or a sub-field zone, comprising the following steps:
(step 1) (102) receiving by the computing unit—from a database and/or from user input and/or from real-time measurements—crop data relating to the at least one crop to be planted in the field or in the sub-field zone and static field data relating to the field or the sub-field zone,
(step 2) (104) receiving by the computing unit—from a database and/or from user input and/or from real-time measurements—at least one type of additional data selected from the group consisting of:
 (A) yield data relating to the field or the sub-field zone,
 (B) weather data relating to the field or the sub-field zone, and
 (C) soil data relating to the field or the sub-field zone,
(step 3) (106) at least based on the crop data, and the static field data, and the at least one type of additional data, initiating and/or performing data processing in at least one database and/or database system containing
 (i) data related to crop data and/or data related to static field data,
 (ii) data related to the at least one treatment parameter, and
 (iii) data related to at least one type of additional data selected from the group consisting of: yield data, weather data, and soil data,
(step 4) (108) outputting the at least one treatment parameter based on the result of the data processing
is shown.

FIG. 2

Figure 2:
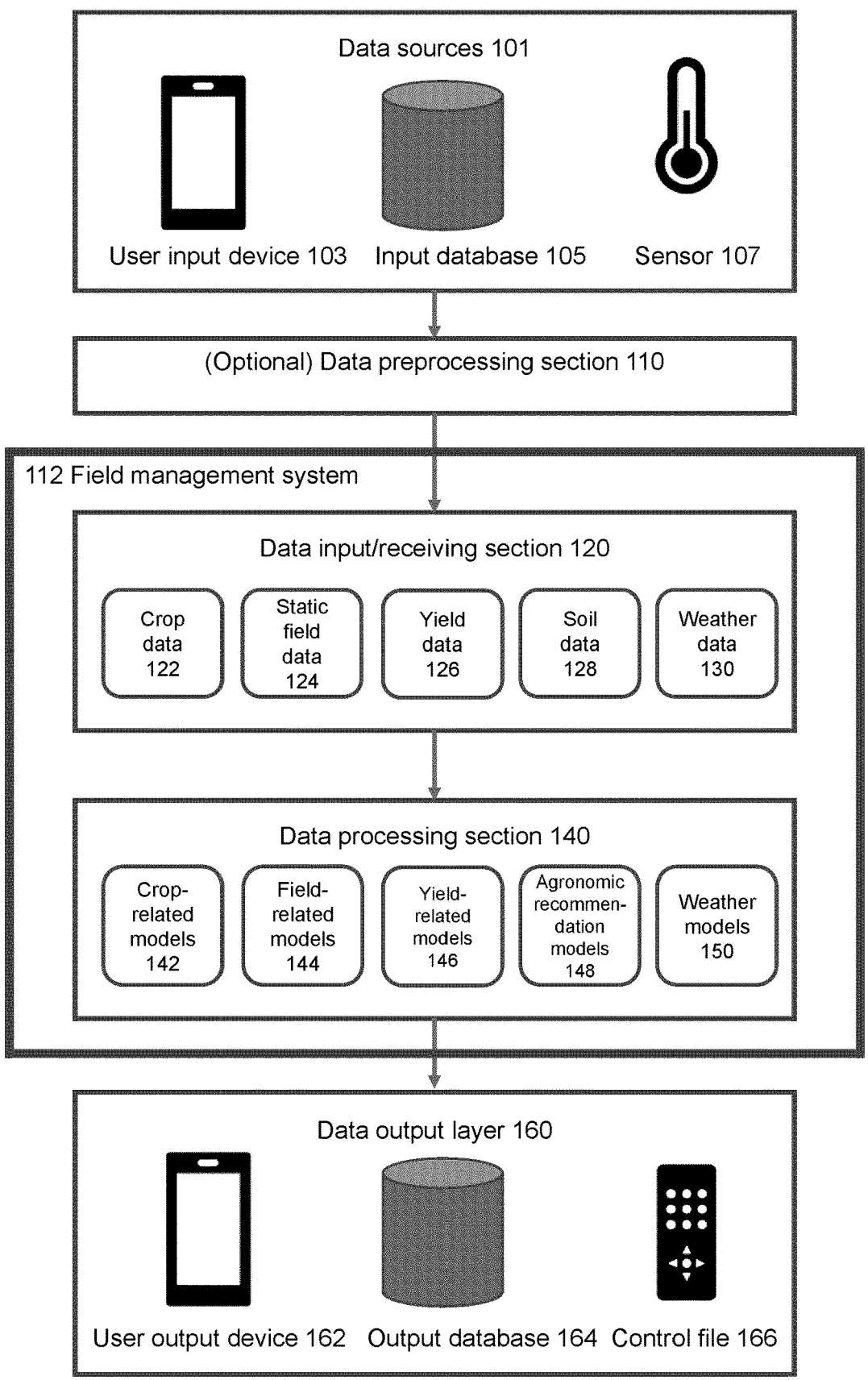

FIG. 2 illustrates an embodiment of the data flow of the computer-implemented method of the present invention.

In a first data flow section, which corresponds to the (step 1) and (step 2) of the computer-implemented method of the present invention, data sources 101 are made available, wherein the data sources can be for example user device 103, database 105 and/or sensor 107. The term "user input device" is understood to be a computer, a smartphone, a tablet, a smartwatch, a monitor, a data storage device, or any other device, by which a user, including humans and robots, can input or transfer data to the field management system 112. The term "input database" is understood to be any organized collection of data, which can be stored and accessed electronically from a computer system, and from which data can be inputted or transferred to the field management system 112. The term "sensor" is understood to be any kind of physical or virtual device, module or machine capable of detecting or receiving real-world information and sending this real-world information to another system, including temperature sensor, humidity sensor, moisture sensor, pH sensor, pressure sensor, soil sensor, crop sensor, water sensor, and cameras.

In a further data flow section, data which originated from one of the data sources 101 are optionally preprocessed in the data preprocessing section 110, wherein such data preprocessing may include data calibration, data transformation (e.g. into a different format), data correction, data validation, and data verification.

In a further data flow section, the data which originated from one of the data sources 101 and which has been optionally preprocessed in the data preprocessing section 110 are inputted into the field management system 112, for example as crop data 122, as static field data 124, as yield data 126, soil data 128, or as weather data 130.

In a further data flow section, which corresponds to the (step 3) of the computer-implemented method of the present invention, the above mentioned data are processed by the field management system in the data processing section 120 using for example one or more crop-related models 142, one or more field-related models 144, one or more yield-related models 146, one or more soil-related models 148, one or more weather models 150, or a combination of such models. Crop-related model 142 is an algorithm which is capable of determining, predicting and/or simulating crop species, crop phenology, crop growth, crop development and other crop related properties based on specific input data. Field-related model 144 is an algorithm which is capable of determining, predicting and/or simulating soil properties of a field, or other field related properties based on specific input data. Yield-related model 146 is an algorithm which is capable of determining, predicting and/or simulating crop yield, including crop phenology and crop biomass based on specific input data. Agronomic recommendation model 148 is an algorithm which is capable of determining one or more methods, products (particularly seeds or seedlings), dosages (particularly seeding rates), time windows, or other treatment parameters for achieving a specific real-world agronomic objective, particularly seeding, based on specific input data. Weather model 150 is an algorithm which is capable of determining, predicting and/or simulating any weather-related parameters including its development, such as temperature, precipitation, moisture, humidity, sunshine, or wind speed. Within the data processing section 120, the output of one of the above mentioned model may also be directly used as input of another of the above mentioned models. Within the data processing section 120, at least two, preferably at least three of the above mentioned models may also be run either in a parallel arrangement or in a sequential arrangement or in a combination of parallel and sequential arrangement.

In a further data flow section, which corresponds to the (step 4) of the computer-implemented method of the present invention, the final outputs of the model(s) in the data processing section 120 are transferred from the field management system to the data output layer 160 and for example outputted on a user device 162, in a output database 164 or as a control file 166. The term "user output device" is understood to be a computer, a smartphone, a tablet, a smartwatch, a monitor, a data storage device, or any other device, by which a user, including humans and robots, can receive data from the field management system 112. The term "output database" is understood to be any organized collection of data, which can be stored and accessed electronically from a computer system, and which can receive data which is outputted or transferred from the field management system 112. The term "control file" is understood to be any binary file, data, signal, identifier, code, image, or any other machine-readable or machine-detectable element useful for controlling a machine or device, for example an agricultural treatment device.

FIG. 3

Figure 3:
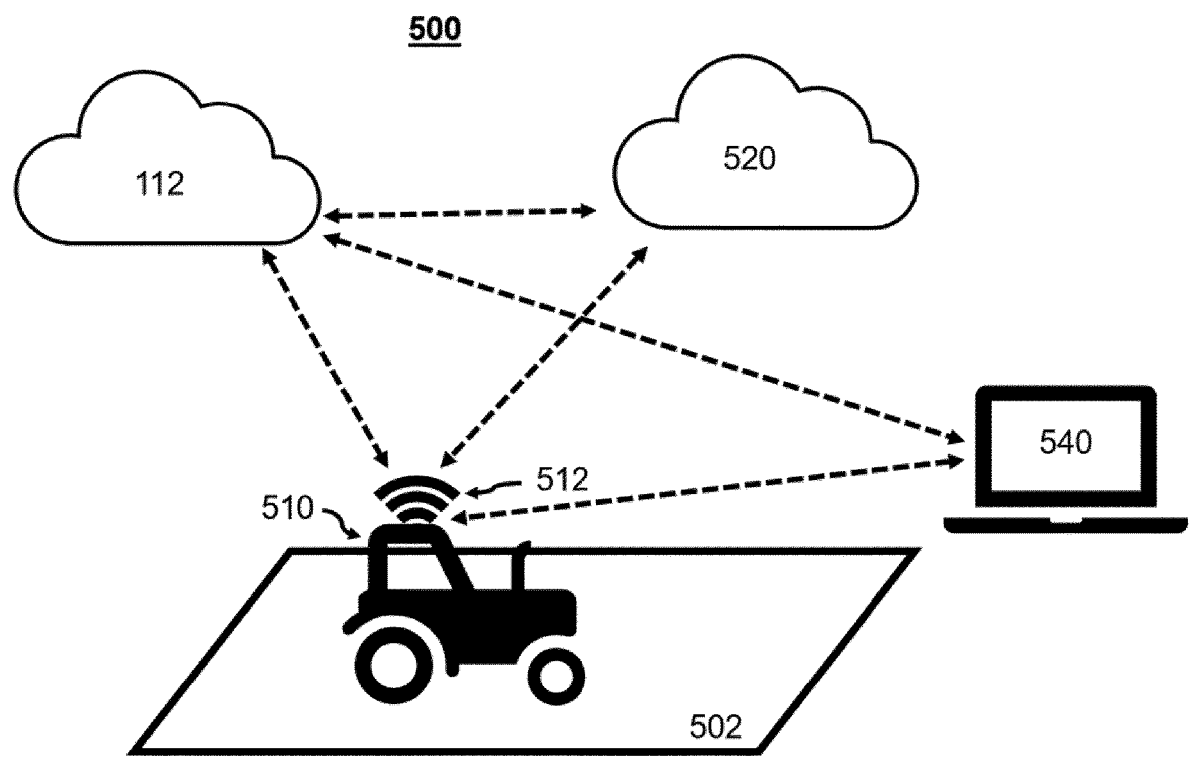

FIG. 3 schematically illustrates a treatment management system 500. The treatment parameters determined by the computer-implemented method of the present invention will be outputted or further processed as a control signal for an agricultural equipment embedded in the treatment management system 500, wherein the agricultural equipment is preferably a seed drill or planter. The treatment management system 500 may comprise a seed drill or planter 510, a data management system 520, a field management system 112, and a client computer 540. The seed drill or planter 510 may be e.g. ground robots with variable-rate applicators, or other variable-rate applicators for applying seed products (particularly seeds and seedlings) to the field 502.

In the example of FIG. 3, the seed drill or planter 510 is embodied as smart farming machinery. The smart farming machinery 510 may be a smart seed drill or smart seed planter and includes a connectivity system 512. The connectivity system 512 may be configured to communicatively couple the smart farming machinery 510 to the distributed computing environment. It may be configured to provide data collected on the smart farming machinery 510 to the data management system 520, the field management system 112, and/or the client computer 540 of the distributed computing environment.

The data management system 520 may be configured to send data to the smart farming machinery 510 or to receive data from the smart farming machinery 510. For instance, as detected maps or as applied maps comprising data recorded during application on the field 502 may be sent from the smart farming machinery 510 to the data management system 520. For instance, the data management system 520 may comprise georeferenced data of different fields and the associated treatment map(s).

The field management system 520 may be configured to provide a control protocol, an activation code or a decision logic to the smart farming machinery 510 or to receive data from the smart farming machinery 510. Such data may also be received through the data management system 520.

The field computer 540 may be configured to receive a user input and to provide a field identifier and an optional treatment specifier to the field management system 112. Alternatively, the field identifier may be provided by the seed drill or planter 510. Alternatively, the optional treatment specifier may be determined using e.g. growth stage models, weather modelling, neighbouring field incidences, etc. The field management system 112 may search the corresponding agricultural field and the associated treatment map(s) in the data management system 520 based on the field identifier and the optional treatment specifier. The field computer 540 may be further configured to receive client data from the field management system 112 and/or the smart farming machinery 510. Such client data may include for instance application schedule to be conducted on certain fields with the smart farming machinery 510 or field analysis data to provide insights into the health state of certain fields.

The treatment device 510, the data management system 520, the field management system 112, and the client computer 540 may be associated with a network. For example, the network may be the internet. The network may alternatively be any other type and number of networks. For example, the network may be implemented by several local area networks connected to a wide area network. The network may comprise any combination of wired networks, wireless networks, wide area networks, local area networks, etc.

The data processing system of the present invention may be embodied as, or in, or as part of the field management system 112 to perform the above-described method to provide a control data to the smart farming machinery 510. For example, the field management system 112 may receive the seed drill/planter configuration data from the seed drill or planter 510 via the connectivity system 512. The field management system 112 may receive geo-dependent environmental data (e.g. temperature, moisture, humidity, and/or wind speed) form one or more sensors installed on the seed drill or planter 510 to monitor environmental data. Alternatively or additionally, the field management system 112 may receive geo-dependent environmental data from weather services.

The invention claimed is:

1. A computer-implemented method for generating a field treatment control output for planting at least one crop in a field or sub-field zone, the method comprising:
   (step 1) receiving crop data relating to the at least one crop to be planted in the field or in the sub-field zone and static field data relating to the field or the sub-field zone, the crop data including at least one of species, variety data, and/or regulatory data, and the static field data including geographic elevation and historical treatment data;
   (step 2) receiving at least one type of additional data selected from the group consisting of:
      (A) yield data including at least historical yield potential based on remotely sensed biomass,
      (B) weather data including at least historical weather patterns and weather forecasts for the field or sub-field zone, and (C) soil data including soil moisture and soil texture from real-time soil sensors;

(step 3) processing, using one or more agronomic recommendation models stored in a field management system, the crop data, the static field data, and the additional data to determine at least one treatment parameter selected from the group consisting of a seeding rate, a seeding depth, and a seeding time window, wherein the treatment parameter is determined based on a combination of yield potential, soil condition, and weather forecast dependent upon availability, wherein a value of the parameter is adjusted according to these inputs; and (step 4) generating a control signal or machine-executable application map comprising the treatment parameters for controlling a seed drill or planter in operation across the field or sub-field zone, wherein each at least one treatment parameter is spatially distributed.

2. The computer-implemented method according to claim 1, wherein the crop data relating to the at least one crop to be planted in the field or in the sub-field zone include:

species or variety data of the at least one crop to be planted in the field or in the sub-field zone, wherein the species or variety data includes genetic information of the at least one crop, and/or crop value data of the at least one crop to be planted in the field or in the sub-field zone, wherein the crop value data includes oil content, protein content, and/or nutrient content of the at least one crop, agronomic data relating to the at least one crop to be planted in the field or in the sub-field zone, wherein the agronomic data includes days to sexual maturity, vigor, emergence rating of the at least one crop, and/or regulatory data relating to the at least one crop to be planted in the field or in the sub-field zone, wherein the regulatory data includes region-specific information on legal framework and/or regulations relating to the treatment parameters, region-specific information on measures of product stewardship, information on biodiversity regulations or biodiversity measures.

3. The computer-implemented method according to claim 1, wherein the static field data relating to the field or the sub-field zone include:

geographical positioning data relating to the field or the sub-field zone, and/or altitude, elevation, slope, and/or relief data relating to the field or the sub-field zone, and/or data relating to the application of crop protection or crop nutrition products on the field or on the sub-field zone in the past, data regarding pre-season soil treatment on the field or on the sub-field zone, and/or data regarding the type of cultivation of the field or the sub-field zone.

4. The computer-implemented method according to claim 1, wherein the yield data relating to the field or the sub-field zone include:

a) historical yield potential of the field or the sub-field zone, wherein the historical yield potential is determined based on remotely sensed green-leaf area or biomass data of the field or the sub-field zone, and/or b) historical actual yield of the field or the sub-field zone, determined based on amounts harvested in the past from the field or sub-field zone, and/or c) forecasted yield potential of the field or the sub-field zone.

5. The computer-implemented method according to claim 1, wherein the yield data relating to the field or the sub-field zone include:

a) historical yield potential of the field or the sub-field zone, wherein the historical yield potential is determined based on remotely sensed green-leaf area or biomass data of the field or the sub-field zone, and/or b) historical actual yield of the field or the sub-field zone, determined based on amounts harvested in the past from the field or the sub-field zone, wherein the historical yield potential and historical actual yield data are combined with predefined or user-defined weighting factors.

6. The computer-implemented method according to claim 1, wherein the weather data relating to the field or the sub-field zone include: temperature, air temperature, soil temperature, soil surface temperature, canopy temperature, humidity, air humidity, relative humidity, precipitation, moisture, wind condition, wind speed, and/or sunlight level data relating to the field or the sub-field zone.

7. The computer-implemented method according to claim 1, wherein the soil data relating to the field or the sub-field zone are data indicative of biological, biochemical, chemical, and/or physical properties of the soil in the field or the sub-field zone.

8. The computer-implemented method according to claim 1, wherein the soil data relating to the field or the sub-field zone include:

a) soil organic matter, total carbon content, organic carbon content, inorganic carbon content, boron content, phosphorus content, potassium content, nitrogen content, sulfur content, calcium content, iron content, aluminium content, chlorine content, molybdenum content, magnesium content, nickel content, copper content, zinc content, Manganese content, and/or pH value of the soil in the field or the sub-field zone; and/or b) soil quality, soil sandiness, soil moisture, soil humidity, soil temperature, soil surface temperature, soil density, soil texture, soil conductivity, and/or water holding capacity of the soil in the field or the sub-field zone.

9. The computer-implemented method according to claim 1, wherein the timeframe between receiving any of the yield data, or weather data, or soil data and the output of the treatment parameter is from 1 millisecond to 1 hour.

10. The computer-implemented method according to claim 1, wherein at least the steps (step 2), (step 3) and (step 4) are carried out in a real-time mode.

11. The computer-implemented method according to claim 1, wherein the treatment parameter is output or further processed as the control signal for an agricultural equipment.

12. The computer-implemented method according to claim 1, wherein the treatment parameters will be outputted as the machine-executable application map for controlling the seed drill or the planter in the operation across the field or the sub-field zone.

13. The computer-implemented method according to claim 1, wherein the control signal is wirelessly transmitted to an agricultural equipment comprising a variable-rate seed drill or planter configured to adjust a planting operation in real time based on the control signal.

14. The computer-implemented method according to claim 1, wherein the data processing in step 3 utilizes a machine learning model trained with historical crop performance data to generate the at least one treatment parameter.

15. The computer-implemented method according to claim 1, wherein the data processing comprises selecting a yield-seeding-rate correlation logic based on crop species or variety and applying either a normal or inverse yield-seeding-rate adjustment rule to determine the seeding rate for each sub-field zone.

16. The computer-implemented method according to claim 1, wherein the control signal generated in step 4 comprises at least a georeferenced instruction indicating a change in at least one of seeding rate, depth, or time based on a sub-field zone's yield forecast and current soil condition.

17. A data processing system comprising a computing unit configured to carry out the computer-implemented method according to claim 1.

18. A non-transitory computer-readable storage medium comprising instructions which, when executed by a computer, cause the computer to carry out the computer-implemented method according to claim 1.

19. A computer-implemented method for generating a field treatment control output for planting at least one crop in a field or sub-field zone, the method comprising:

(step 1) receiving crop data relating to the at least one crop to be planted in the field or in the sub-field zone and static field data relating to the field or the sub-field zone, the crop data including at least one of species, variety data, and/or regulatory data, and the static field data including geographic elevation and historical treatment data;

(step 2) receiving at least one type of additional data selected from the group consisting of:
(A) yield data including at least historical yield potential based on remotely sensed biomass,
(B) weather data including at least historical weather patterns and weather forecasts for the field or sub-field zone, and
(C) soil data including soil moisture and soil texture from real-time soil sensors;

(step 3) processing, using one or more agronomic recommendation models stored in a field management system, the crop data, the static field data, and the additional data to determine at least one treatment parameter selected from the group consisting of a seeding rate, a seeding depth, and a seeding time window, wherein the treatment parameter is determined based on a combination of yield potential, soil condition, and weather forecast dependent upon availability, wherein the value of the parameter is adjusted according to these inputs; and (step 4) generating a control signal comprising the treatment parameters for controlling a seed drill or planter in operation across the field or sub-field zone, wherein each treatment parameter is spatially distributed.

* * * * *